United States Patent [19]
Buisson et al.

[11] 3,871,174
[45] Mar. 18, 1975

[54] JET ENGINES

[75] Inventors: Marc François Bernard Buisson, Le Mee-Sur-Seine; Hervé Alain Quillévéré, Issy-Les-Moulineaux, both of France

[73] Assignee: Societe Nationale d'Etude et de Construction de Moteurs d', Paris, France

[22] Filed: Apr. 24, 1973

[21] Appl. No.: 354,093

[30] Foreign Application Priority Data
Apr. 25, 1972 France .......................... 72.14684

[52] U.S. Cl. ........................... 60/261, 60/262
[51] Int. Cl. ............................... F02k 3/10
[58] Field of Search .......................... 60/261, 262

[56] References Cited
UNITED STATES PATENTS
2,588,532  3/1952  Johnson .............................. 60/262
2,978,865  4/1961  Pierce ................................. 60/261

Primary Examiner—Carlton R. Croyle
Assistant Examiner—O. T. Sessions
Attorney, Agent, or Firm—Watson, Cole, Grindle & Watson

[57] ABSTRACT

A jet engine comprising a primary flow of hot gas and a secondary air flow which are separated, up to the entrance to an afterburner duct provided with annular flame-holders by a wall which is supported, on the upstream side, on the rear end of a turbine casing and which corrugates progressively up to a rear edge, the said primary flow or secondary flow, or both, being affected, upstream of the said wall, by disturbances which change the velocity ratio of the two flows in areas located downstream of the disturbances, in which the radius of the said rear edge of the wall is relatively great in the areas in which the ratio between the velocity of the primary flow and the velocity of the secondary flow is relatively small, and vice versa.

11 Claims, 6 Drawing Figures

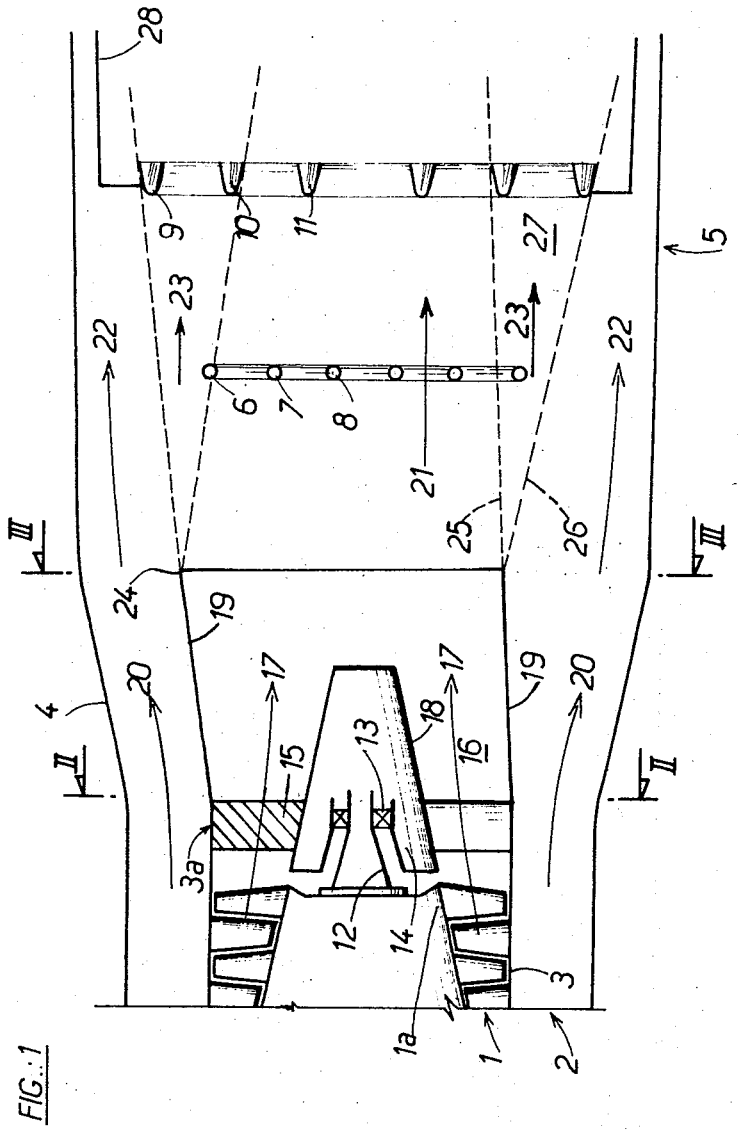

JET ENGINES

BACKGROUND OF THE INVENTION

The invention relates to by-pass jet engines comprising coaxial inner and outer casings bounding coaxial inner and outer ducts for an inner flow of hot gas and an outer flow of air, which merge into an afterburner duct in which the two flows can be reheated, upstream of the nozzle, by means of an afterburner device comprising annular flame-holders. It particularly applies to gas turbine jet engines of the by-pass type for use in aviation.

The Mach number of the flow of hot gases at the outlet of the turbine in a jet engine of this type is generally of the order of 0.5. It is therefore necessary to reduce its velocity appreciably so that stabilization of the afterburning flame is possible. The velocity reduction in speed is carried out in a diffuser and, in the majority of gas turbine jet engines, this diffuser has, passing across it, streamlined struts which serve to support the downstream bearing of the turbine shaft. These arms are few in number and also serve to eliminate the residual swirl of the turbine outlet flow.

In certain jet engines, means are provided for mixing the two flows downstream of the diffuser and upstream of the afterburning device, whereas in other jet engines the two flows are reheated separately by two distinct afterburner devices, but the invention relates more specifically to jet engines of a third kind, in which the two flows coexist upstream of a common afterburning device. The two flows only actually mix at their boundary, and each of them partially retains its individuality.

In jet engines of this kind, the mixture of the two flows develops from their junction, that is to say downstream of a material separating wall described as "confluence", which forms, or extends in the rearward direction, the outer wall of the above-mentioned diffuser which serves to slow down the hot flow. Downstream of this material wall, the velocities of the two flows are substantially parallel, and the development of their mixing zone in the downstream direction is dependent upon the local velocities and specific masses of each of them. Upstream of their junction-point, these flows may contain disturbances (in particular, the wakes of the above-mentioned struts in the hot flow and/or of any material obstacles which may be provided in the cold flow) which modify the local conditions of the outflow and therefore the conformation of the boundary in which the two flows mix. For example, the hot flow is slowed down in the wake of a supporting arm for a turbine bearing support strut in conformity with the known laws governing mixtures of jets, the mixing zone of the two flows is therefore deflected, in a first sector area of the outer duct comprising the strut wake, towards the axis of the jet engine; in a second sector area contained between two wakes, there is a tendency for the mixing zone to be deflected in the opposite direction. In the same way, the mixing zone will be moved away from the axis in second sector areas of the inner duct comprising the wake regions of any obstacles which may be situated in the secondary flow, and will be deflected towards the axis in first sector areas contained these wake regions.

These deformations of the mixing zone give rise to heterogeneities of temperature in the outflow originating from upstream, along the circumference of the annular flame-holders situated close to this zone. The temperature differences may, in some cases, be as much as 200° to 300°C and present various drawbacks. First of all, combustion occurs in an irregular manner and its efficiency is therefore reduced. Furthermore, combustion develops from the hot points on the flame-holders in a different manner than from the cold points; this gives rise, over the heat shield and over the afterburning duct, to hot wakes which result in limitation of the maximum rate of reheating which can be achieved.

SUMMARY OF THE INVENTION

The object of the present invention is to eliminate, or at least to substantially reduce the above-mentioned drawbacks.

According to the invention, there is provided a jet engine comprising a primary flow of hot gas and a secondary air flow which are separated, up to the entrance to an afterburning duct inlet provided with annular flame-holders, by a material wall which is supported, on the upstream side, on the rear end of a turbine casing and which corrugates progressively up to the a rear edge, the said primary flow or secondary flow, or both, being affected, upstream of the said material wall, by disturbances which change the ratio of the velocities of the two flows in the areas situated downstream of the said disturbances, wherein the radius of the said rear edge is relatively great in the areas in which the ratio between the velocity of the primary flow and that of the secondary flow is relatively small, and vice versa.

More generally speaking, when the primary flow and/or the secondary flow, or both, are affected by disturbances which change the velocity ratio of the two flows in the downstream areas, the confluence is given a shape which corrugates progressively up to its downstream edge, the radius of which is relatively great in those areas in which the ratio between the velocity of the primary flow and that of the secondary flow is relatively small, and vice versa.

FIG. 6 shows an embodiment in which the afterburner duct 105 is inclined at a kink angle $\alpha$ to the turbine 101 and secondary duct 102. If the confluence wall was coaxial to the afterburner duct 105, as shown in broken lines at 119a, the kink angle would produce overheating of the parts of the afterburner duct 105 and flame-holders 109, 110, 111 that are shown in the lower half of the drawing. This detrimental overheating effect is compensated for by further inclining the confluence wall 119 in the direction of the kink When the afterburner duct is not straight, but is slightly curved or inclined, for example in the case of two jet engines situated side by side, a so-called kink angle of the duct is produced, giving rise to slight overheating of half of the duct, which is added to the hot wakes mentioned above. According to one feature of the invention, it is possible to compensate for this effect by making the outlet edge of the confluence eccentric in the direction of inclination of the duct.

BRIEF DESCRIPTION OF THE DRAWINGS.

The invention will now be further described, by way of example, with reference to the accompanying drawings, in which:

FIG. 1 shows a portion of a gas turbine jet engine of the by-pass type, viewed in section along the line I—I in FIGS. 2 and 3;

FIG. 6 shows an embodiment in which the afterburner duct 105 is inclined at a kink angle α to the turbine 101 and secondary duct 102. If the confluence wall was coaxial to the afterburner duct 105, as shown in broken lines at 119a, the kink angle would produce overheating of the parts of the afterburner duct 105 and flame-holders 109, 110, 111 that are shown in the lower half of the drawing. This detrimental overheating effect is compensated for by further inclining the confluence wall 119 in the direction of the kink angle, at an angle β to the afterburner duct 105, to make the outlet edge 124 of the confluence wall eccentric with respect to the afterburner duct in the direction of the kink angle.

The remaining numerals (103, 103a, 104, 106, 107, 108, 117, 120, 122 and 128) in FIG. 6 correspond to similar numerals and elements in FIGS. 1 and 5.

DESCRIPTION OF PREFERRED EMBODIMENTS

Figure 3:
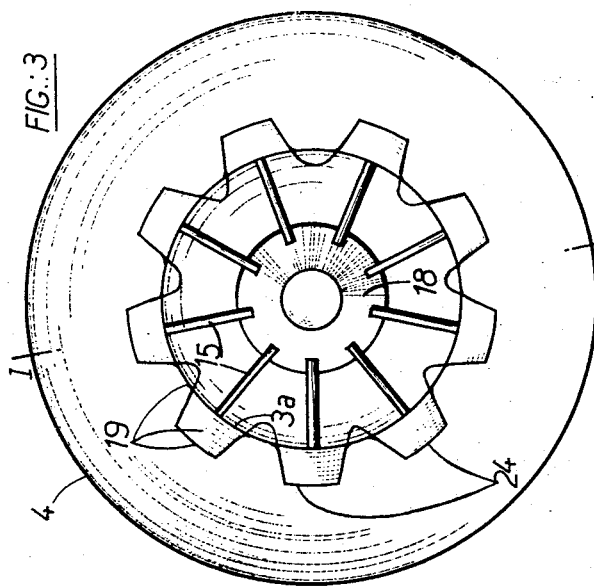
FIGS. 2 and 3 are views in section along the lines II—II and III—III respectively, in FIG. 1.

The parts of a gas turbine jet engine for use in aviation which are shown in FIG. 1 comprise the rear part of a turbine 1 and of the secondary duct 2 surrounding the casing 3 of the turbine in the outer casing 4 of the jet engine, and an afterburner duct 5. The parts which are not illustrated comprise, at the front of the jet engine, an intake duct, a compressor driven by the turbine 1 and a combustion chamber surrounded by the secondary duct 2 and, at the rear of the afterburner duct 4, an ejection nozzle.

The compressor supplies the combustion chamber and the secondary duct 2 with compressed air. The combustion chamber is also supplied with fuel, the combustion of which in air produces hot gases which operate in the turbine 1 and pass out of the latter and into the afterburner duct 5, where they are rejoined by the secondary air coming from the duct 2. When the jet engine is operating without afterburning, the hot gases and the secondary air pass out through the nozzle, forming a jet which produces the thrust used for propulsion purposes. The duct 4 contains an afterburner device comprising circular injection manifolds, which are represented in diagrammatic form at 6, 7 and 8, annular flame-holders which are represented in diagrammatic form at 9, 10 and 11 and are situated downstream of the said manifolds. When it is desired to increase the thrust, fuel is injected, by means of the manifolds 6, 7 and 8, and this fuel burns in the oxygen originating from the secondary air-flow and from the residual air remaining in the hot gases which pass out of the turbine, forming flames which cling to the annular flame holders 9, 10 and 11.

The rotor 1a of the turbine 1 and that of the compressor are integral with a common shaft, the rear end 12 of which is supported by a bearing 13 mounted in a structure 14 which is itself supported in latter axis of the engine by means which are not shown, and are connected to a rear portion 3a of the turbine casing 3 by streamlined struts 15 which pass radially across the annular duct 16 in which the hot gas flow 17 originating from the turbine 1 flows. The structure 14 is enclosed in a truncated cone-shaped casing manifolds, and the rear portion 3a of the turbine casing 3 is extended in the downstream direction by the wall 19, called a confluence, which separates the secondary air flow 20 from the primary flow of hot gases 17 as far as a region which is situated downstream of the truncated cone-shaped housing 18 and upstream of the injectors 6, 7 and 8, which region may be regarded as the starting point of the afterburner duct 5. The rear portion 3a of the turbine casing and the confluence 19 combine with the truncated cone-shaped casing 18 to form a diffuser 16a which serves to slow down the primary flow of hot gases 17.

This flow of hot gases 17 and the secondary air-flow 20 penetrate coaxially into the afterburner duct 5 and mingle at their boundary in such a way that the outflow in the duct 5 comprises an inner flow of hot gases 21 and an outer annular flow of substantially colder air 22. Flowing between these two flows 21 and 22, in the direction of the arrow 23, is a mixture of these two gases, the flow rate of which becomes increasingly greater as it moves away from the rear edge 24 of the confluence 19. The zone 27, which is described as the "mixing" zone and in which this mixture flows, has been illustrated diagrammatically by broken lines 25 and 26.

Figure 5:
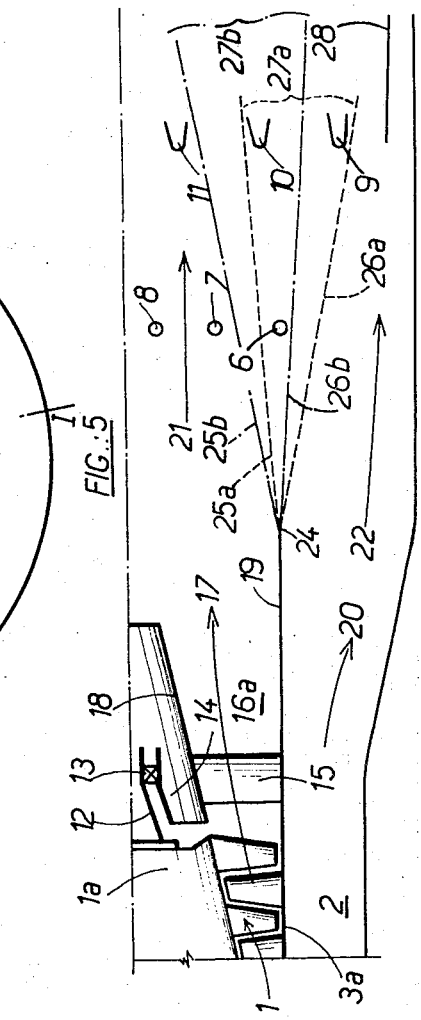
FIG. 5 is a view in half-section like that in FIG. 1, showing the effect of a wake in the primary flow.
Figure 4:
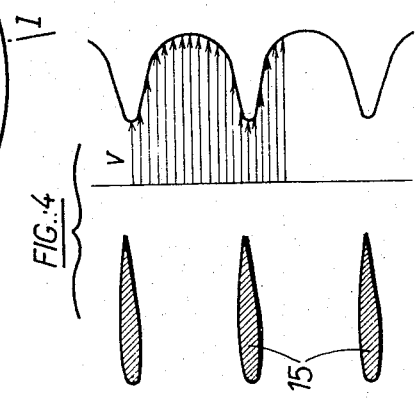
FIG. 4 is a partial, developed view, on a larger scale, of the turbine bearing support strut of the turbojet in the preceding figures, showing diagrammatically the velocity distribution of the speeds of the hot flow in the diffuser.

FIG. 5 diagrammatically illustrates the effects, which were called to mind in the introduction to the present description, of an obstacle disposed in the primary duct 16. The broken lines 25a and 26a show the mixing zone 27a downstream of a sector of the duct 16 which is devoid of any obstacle. The presence of an obstacle in this duct creates, downstream, a wake in which the hot flow 21 is slowed down, which has the effect of deflecting the mixing zone at 27b towards the axis of the jet engine as shown by the dash-dot lines 25b and 26b. For example, the annular flame-holder which, in the first instance, was located at the edge of the hot outflow 21, is now located in the centre of the mixing zone 27b, which is substantially colder, while the annular flame-holder 9 passes from the mixing zone 27a into the flow 22, which is still colder. FIG. 4 illustrates, in diagrammatic form, the distribution of the velocities V at the periphery of the flow 21, at a point situated downstream of the stuts 15. It will be seen that the velocity varies periodically, along the periphery, between a minimum value in the wake of each strut and a maximum value at the halfway point between two adjacent wakes. It will therefore be understood that, if special precautions were not taken, the mixing zone 27 would follow these variations, thereby producing, along the circumference of the annular flame-holder, a succession of hot points and cold points. This would result in the drawbacks already mentioned: irregular combustion with reduced output, combustion developing from hot points in a different manner than from cold points and giving rise, over the wall of the afterburning duct 5 and over its heat shield 28 (FIG. 1), to hot wakes which make it obligatory to limit the rate of reheating.

Figure 2:
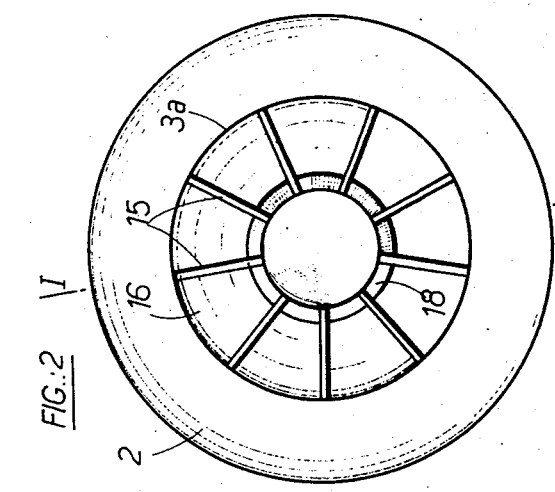
Figure 6:
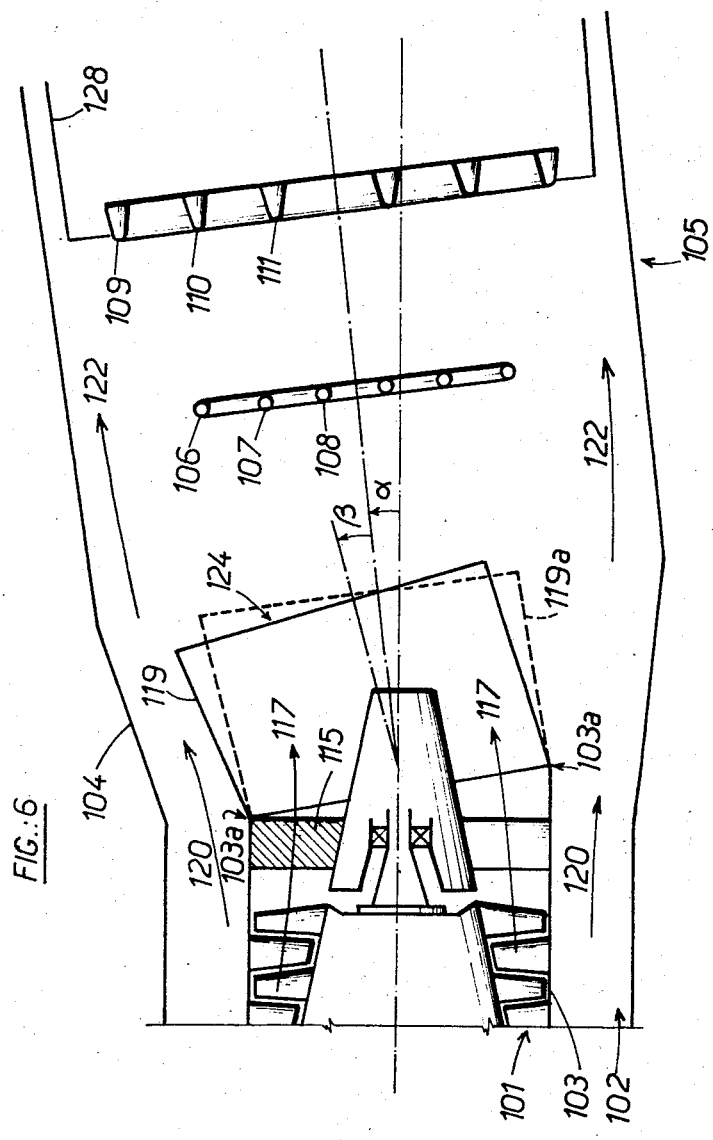
FIG. 6 is a view similar to FIG. 1, showing a modified embodiment.

According to the present invention, the confluence 19 is not a wall of circular cross-section but a progressively corrugating wall which is supported, on the upstream side, on the circular rear edge of the portion 3a of the casing (see FIG. 2), and the rear edge 24 of which corrugates undulates in the manner shown in FIG. 3, that is to say with a relatively large radius in the wakes of the struts 15 and a relatively small radius between these wakes. It will be understood from FIG. 1 that it is thus possible to obtain an arrangement in which each annular flame-holder is immersed, over its entire circumference, either in the hot flow 21 or cold flow 22, or else in the mixing zone 27, which eliminates the drawbacks mentioned. angle, at an angle β to the afterburner duct 105, to make the outlet edge 124 of the confluence wall eccentric with respect to the afterburner duct in the direction of the kink angle The remaining numerals (103, 103a, 104, 106, 107, 108, 117, 120, 122 and 128) in FIG. 6 correspond to similar numerals and elements in FIGS. 1 and 5.

What is claimed is:

1. A jet engine comprising:
   a. coaxial inner and outer casings bounding coaxial inner and outer duct means for an inner flow of hot gas and an outer flow of air flowing in said inner and outer duct means, respectively, at a given ratio of the velocity of the inner flow to the velocity of the outer flow;
   b. disturbance generating means in at least one of said inner and outer duct means, which are effective to reduce said given velocity ratio in at least one first sector area of said at least one duct means, and to increase said given velocity ratio in at least one second sector area of at least one duct means adjoining said first sector area;
   c. a confluence wall extending the inner casing beyond a downstream edge thereof to separate the outer flow from the inner flow;
   d. means forming an afterburner duct downstream of the confluence wall for receiving both said inner and outer flows flowing coaxially, including annular flame-holder means in the afterburner duct; and
   e. corrugations in the confluence wall, extending from said downstream edge of the inner casing to a corrugated outlet edge of the confluence wall having an increased radius downstream of said first sector area, and a reduced radius downstream of said second sector area.

2. A jet engine as claimed in claim 1, wherein the disturbance generating means comprise a plurality of struts extending radially across the inner duct means to support a member within the inner casing, and the corrugated outlet edge of the confluence wall has increased radii in the areas thereof located downstream of said struts.

3. A jet engine as claimed in claim 1, wherein the afterburner duct is inclined at a kink angle to the coaxial inner and outer casings, and the outlet edge of the confluence wall is eccentric with respect to the afterburner duct in the direction of the kink angle.

4. A jet engine as claimed in claim 1, wherein the afterburner duct is inclined at a kink angle to the coaxial inner and outer casings, and the confluence wall is inclined at a further angle to the afterburner duct in the direction of the kink angle.

5. A jet engine comprising:
   a. coaxial inner and outer casings bounding coaxial inner and outer duct means for an inner flow of hot gas and an outer flow of air, respectively;
   b. means forming an afterburner duct downstream of the inner casing for receiving both said inner and outer flows flowing coaxially, the afterburner duct being inclined at a kink angle to the coaxial inner and outer casings;
   c. and a confluence wall extending the inner casing into the afterburner duct beyond a downstream edge of the inner casing and having an outlet edge eccentric with respect to the afterburner duct in the direction of the kink angle.

6. A jet engine comprising:
   a. coaxial inner and outer casings bounding coaxial inner and outer duct means for an inner flow of hot gas and an outer flow of air, respectively;
   b. means forming an afterburner duct downstream of the inner casing for receiving both said inner and outer flows flowing coaxially, the afterburner duct being inclined at a kink angle to the coaxial inner and outer casings: and
   c. a confluence wall extending the inner casing into the afterburner beyond a downstream edge of the inner casing and inclined at a further angle to the afterburner duct in the direction of the kink angle.

7. A gas turbine jet engine of the by-pass type, comprising:
   a. a turbine casing;
   b. a gas turbine unit for producing a primary flow of hot gas in the turbine casing and having a downstream bearing;
   c. a plurality of struts extending radially across the turbine casing to support said downstream bearing;
   d. means bounding an outer duct means coaxial to the turbine casing for a secondary flow of air;
   e. means forming a diffuser downstream of the turbine casing to slacken the primary flow, including a confluence wall extending the turbine casing beyond a downstream edge thereof to separate the secondary flow from the primary flow;
   f. means forming an afterburner duct downstream of the diffuser for receiving both said primary and secondary flows flowing coaxially, including annular flame-holder means in the afterburner duct; and
   g. corrugations in the confluence wall, extending from said downstream edge of the turbine casing to a corrugated outlet edge of the confluence wall having increased radii in first sector areas thereof located downstream of said struts, and reduced radii in second sector areas intermediate said first sector areas.

8. A gas turbine jet engine as claimed in claim 7, wherein the afterburner duct is inclined at a kink angle to the turbine casing, and the outlet edge of the confluence wall is eccentric with respect to the afterburner duct in the direction of the kink angle.

9. A gas turbine jet engine as claimed in claim 7, wherein the afterburner duct is inclined at a kink angle to the turbine casing, and the confluence wall is inclined at a further angle to the afterburner duct in the direction of the kink angle.

10. A gas turbine jet engine of the by-pass type comprising:
   a. a turbine casing;
   b. a gas turbine unit for producing a primary flow of hot gas in the turbine casing;
   c. means bounding an outer duct means coaxial to the turbine casing for a secondary flow of air;
   d. means forming an afterburner duct downstream of the turbine casing for receiving both said primary and secondary flows flowing coaxially, the afterburner duct being inclined at a kink angle to the turbine casing; and e. a confluence wall extending the turbine casing into the afterburner duct beyond a downstream edge of the inner casing, and having an outlet edge eccentric with respect to the afterburner duct in the direction of the kink angle.

11. A gas turbine jet engine of the by-pass type, comprising:
   a. a turbine casing;
   b. a gas turbine unit for producing a primary flow of hot gas in the turbine casing;
   c. means bounding an outer duct means coaxial to the turbine casing for a secondary flow of air;
   d. means forming an afterburner duct downstream of the turbine casing for receiving both said primary and second flows flowing coaxially, the afterburner duct being inclined at a kink angle to the turbine casing; and
   e. a confluence wall extending the turbine casing into the afterburner duct beyond a downstream edge of the inner casing, and inclined at a further angle to the afterburner duct in the direction of the kink angle.

* * * * *

UNITED STATES PATENT OFFICE
CERTIFICATE OF CORRECTION

Patent No. 3,871,174                    Dated March 18th, 1975

Inventor(s)  Marc Francois Bernard Buisson et al

It is certified that error appears in the above-identified patent and that said Letters Patent are hereby corrected as shown below:

[73] Assignee:  Societe Nationale d'Etude et de

Construction de Moteurs d'Aviation,

Paris, France

Signed and sealed this 15th day of July 1975.

(SEAL)
　Attest:

RUTH C. MASON
　Attesting Officer

C. MARSHALL DANN
Commissioner of Patents
　　　and Trademarks